(12) United States Patent
Jiang et al.

(10) Patent No.: US 11,409,313 B2
(45) Date of Patent: Aug. 9, 2022

(54) VOLTAGE REFERENCE ARCHITECTURE

(71) Applicant: QUALCOMM Incorporated, San Diego, CA (US)

(72) Inventors: Jize Jiang, Singapore (SG); Hua Guan, San Diego, CA (US); Kuan Chuang Koay, Singapore (SG)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/138,463

(22) Filed: Dec. 30, 2020

(65) Prior Publication Data
US 2022/0206520 A1 Jun. 30, 2022

(51) Int. Cl.
*G05F 1/56* (2006.01)
*H04B 1/40* (2015.01)

(52) U.S. Cl.
CPC . *G05F 1/56* (2013.01); *H04B 1/40* (2013.01)

(58) Field of Classification Search
None
See application file for complete search history.

(56) References Cited

U.S. PATENT DOCUMENTS

| | | | | |
|---|---|---|---|---|
| 8,080,982 | B2* | 12/2011 | Lin | G05F 1/56 |
| | | | | 323/275 |
| 8,482,502 | B2* | 7/2013 | Kim | G09G 3/3655 |
| | | | | 345/92 |
| 9,473,097 | B2* | 10/2016 | Rouat | H03F 3/45071 |
| 9,672,885 | B2* | 6/2017 | Kim | G11C 11/1675 |
| 10,209,279 | B2* | 2/2019 | Tran | G01R 33/02 |
| 2008/0246712 | A1* | 10/2008 | Cavallini | G09G 3/3685 |
| | | | | 345/89 |

* cited by examiner

*Primary Examiner* — Jeffery S Zweizig
(74) *Attorney, Agent, or Firm* — Patterson & Sheridan, LLP

(57) ABSTRACT

Aspects of the present disclosure provide a voltage reference architecture. An example circuit generally includes a resistor ladder, a reference current source, and a plurality of multiplexers. The resistor ladder comprises a plurality of resistive elements coupled in series. The reference current source has an output coupled to the resistor ladder. The plurality of multiplexers have inputs coupled to one or more nodes between the plurality of resistive elements and the output of the reference current source, each of the multiplexers having an output selectively coupled to one of the inputs of the multiplexer.

20 Claims, 8 Drawing Sheets

VOLTAGE REFERENCE ARCHITECTURE

BACKGROUND

Field of the Disclosure

Certain aspects of the present disclosure generally relate to electronic circuits and, more particularly, to a low noise voltage reference architecture.

Description of Related Art

Battery-operated devices use power supply management to convert the voltage output by a battery to a low noise power source for various active components (e.g., processors, sensors, wireless transceivers, displays, etc.) in the device. Power supply management is often implemented using direct current (DC)-to-DC converters. One example DC-to-DC converter is a linear regulator. Linear regulators include a transistor that operates in the linear region. Linear regulators produce a low noise output voltage. Conventional electronic systems, such as a system-on-a-chip (SOC), include various subsystems. The various subsystems may be operated under different operational voltages tailored to the functions of the subsystems, such as analog functions, digital functions, radio frequency functions, etc. Voltage regulators are employed to deliver specific voltages to the various subsystems. Voltage regulators may also be employed to keep the subsystems isolated from one another.

Another example DC-to-DC converter is a switched-mode power supply (SMPS). A SMPS may employ a switching regulator which rapidly switches a power transistor between saturation (full on) and cutoff (completely off) with a variable duty cycle. The resulting waveform is low-pass filtered in order to produce a nearly constant output voltage, which may be proportional to the average value of the duty cycle. In other words, the SMPS provides a variable output voltage, which may facilitate efficient operation of certain electronic systems in terms of power consumption.

In certain cases, a wireless communication device may include a radio frequency (RF) transceiver (also referred to as a radio frequency front-end) for transmitting and/or receiving RF signals. Various components of the RF transceiver may be powered by linear regulators and/or an SMPS. For example, on the transmit-side of an RF transceiver, an SMPS may supply power to a power amplifier for amplifying the RF signals before transmission. Other components, such as a modem, analog-to-digital converter, or digital-to-analog converter, may be powered by linear regulators. Wireless communication devices are widely deployed to provide various communication services such as telephony, video, data, messaging, broadcasts, and so on. Such wireless communication devices may transmit and/or receive RF signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., Wi-Fi), and the like.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include a low noise voltage reference for power management circuits.

Certain aspects of the present disclosure provide a circuit. The circuit generally includes a resistor ladder, a reference current source, and a plurality of multiplexers. The resistor ladder comprises a plurality of resistive elements coupled in series. The reference current source has an output coupled to the resistor ladder. The plurality of multiplexers have inputs coupled to one or more nodes between the plurality of resistive elements and the output of the reference current source, each of the multiplexers having an output selectively coupled to one of the inputs of the multiplexer.

Certain aspects of the present disclosure provide a method of supplying power. The method generally includes generating multiple reference voltages, where the generation of multiple reference voltages comprises generating a reference current with a reference current source, and supplying the reference current to a resistor ladder comprising a plurality of resistive elements coupled in series, wherein the reference current source has an output coupled to the resistor ladder and wherein the multiple reference voltages are generated at one or more nodes between the plurality of resistive elements and the output of the reference current source. The method further includes selecting, with a plurality of multiplexers having inputs coupled to the one or more nodes and the output of the reference current source, one of the multiple reference voltages output by each of the multiplexers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
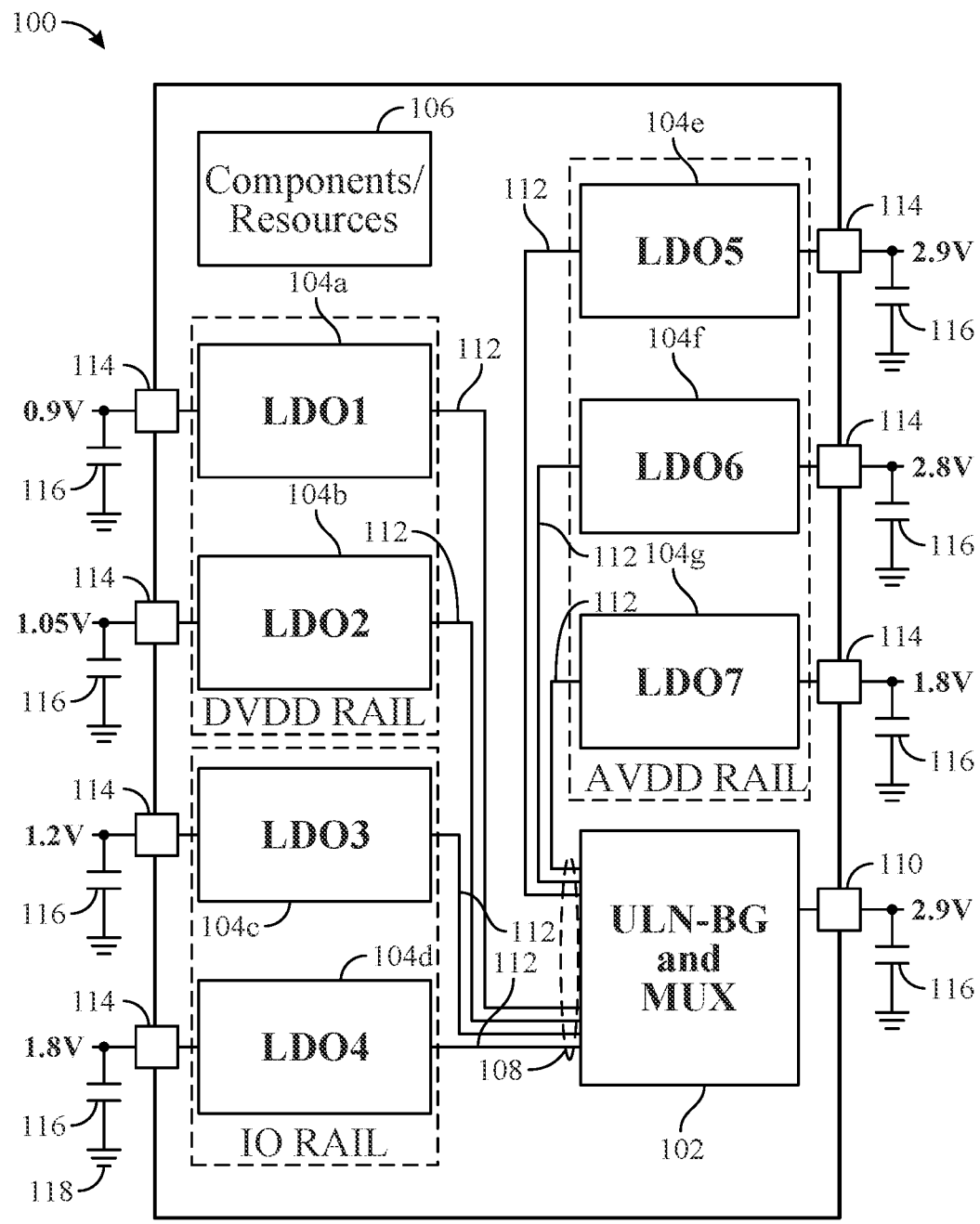
FIG. 1 is a block diagram illustrating an example power management circuit, in accordance with certain aspects of the present disclosure.

Certain aspects of the present disclosure relate to a low noise voltage reference architecture, including a power management circuit and a method of supplying power with the power management circuit.

In certain cases, battery-operated devices (such as a mobile phone, smartphone, smart watch, digital camera, tablet computer, laptop computer, etc.) may employ a power management integrated circuit (PMIC) to provide various power related functions such as DC-to-DC conversion, battery charging, power-source selection, voltage scaling, power sequencing, etc. For example, the PMIC may have multiple low noise linear regulators to provide various voltage rails for the various electronic components (such as analog devices, digital devices, sensors, input/output (I/O) devices or interfaces, etc.). In certain implementations, the PMIC may supply specific reference voltages to low-dropout (LDO) regulators serving as the linear regulators in the PMIC, and each of the LDO regulators may amplify the supplied reference voltage. As a result, the amplification at the LDO regulator may lead to amplifying noise. Noise from the amplification may make up a majority of the noise encountered at the output of the LDO regulators. For example, the noise encountered at the output of the LDO regulators may be about 24 µVrms at frequencies of 10 Hz to 100 kHz. An on-chip resistor-capacitor (RC) circuit may be coupled between the amplifier and LDO regulator to filter out some of the noise due to amplification. In certain cases, the corner frequency (e.g., 1 kHz) of the RC circuit may be too high to sufficiently filter out the noise. As such, the noise exhibited by certain LDOs may be undesirable for certain components, such specific radio frequency (RF) transceivers (e.g., 5G RF transceivers in the millimeter wave (mmWave) bands (24.25 GHz to 52.6 GHz)) and specific camera sensors (e.g., 100+ megapixel camera sensors).

Certain aspects of the present disclosure provide a low noise voltage reference architecture for power management circuits. In aspects, the low noise voltage reference architecture may be based on a bandgap reference architecture. The low noise voltage reference architecture may include a current source coupled to a resistor ladder providing reference voltages at various tapping points along the resistor ladder as further described herein with respect to FIGS. 2-4. Power management circuits may include the low noise voltage reference architecture as described herein without an amplifier coupled between the voltage reference architecture and linear regulators. Without the amplifier, the power management circuits may eliminate a leading source of the noise encountered at outputs of the linear regulators. In certain aspects, the low noise voltage reference architecture may facilitate the noise encountered at the output of LDO regulators to be less than 7 µVrms at frequencies of 10 Hz to 100 kHz.

The low noise voltage reference architecture may provide various advantages. For example, the voltage reference architecture may enable low noise power rails for specific noise sensitive circuits, such as RF transceivers operating in the mmWave bands and 100+ megapixel camera sensors. The low noise voltage reference architecture may provide a desirable area reduction of an integrated circuit having the voltage reference architecture due to replacement of the separate amplifiers for each LDO with a current source, resistor ladder, and multiplexers. In certain cases, the low noise voltage reference architecture may eliminate or reduce testing time used to calibrate each of the linear regulators (such as trimming the output voltage with a potentiometer at each of the linear regulators) due to the elimination of a voltage offset produced by the amplifier.

Example Power Management Circuit

FIG. 1 is a block diagram illustrating an example power management circuit 100 having a low noise voltage reference circuit, in accordance with certain aspects. As shown, the power management circuit 100 includes a voltage reference circuit 102, linear regulators 104a-104g (which may be collectively referred to as "linear regulators 104"), and various other components and resources 106. In certain aspects, the power management circuit 100 may be an integrated circuit (such as a power management integrated circuit (PMIC)) or integrated with another circuit such as a system-on-a-chip (SoC), for example, as further described herein with respect to FIG. 6.

Figure 2:
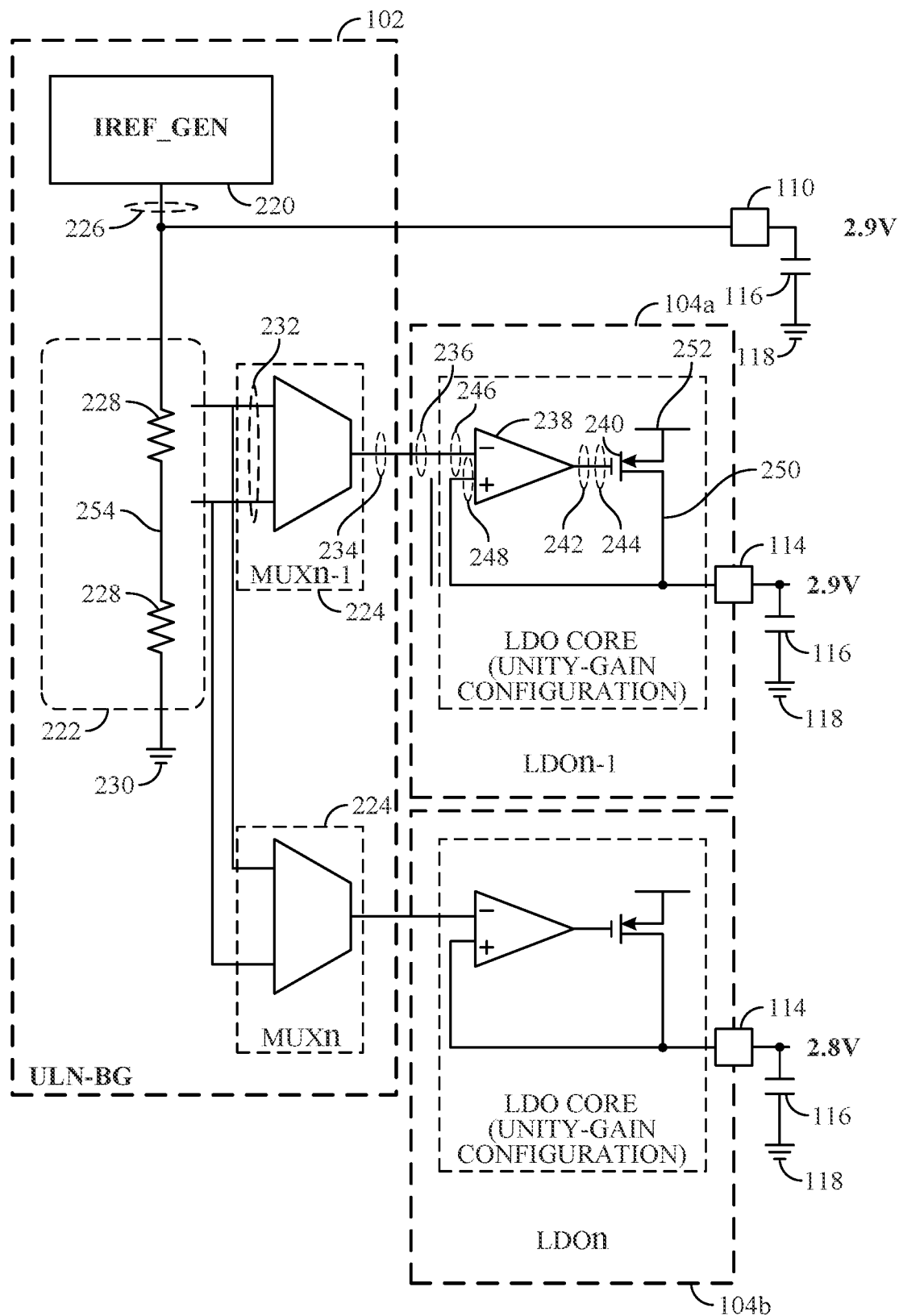
FIG. 2 is a diagram illustrating an example voltage reference circuit coupled to linear regulators, in accordance with certain aspects of the present disclosure.

The voltage reference circuit 102 may provide various reference voltages with a resistor ladder and current source as further described herein with respect to FIG. 2. In aspects, the voltage reference circuit 102 may be implemented by or include an ultra-low noise bandgap (ULN-BG) reference. The voltage reference circuit 102 may have internal outputs 108 at various reference voltages and an external output 110 at a specific reference voltage. In certain aspects, the voltage of the external output 110 may match the output voltage of one of the linear regulators 104 (such as the linear regulator 104e). For example, the voltage at the external output 110 may be the same as the voltage of the linear regulator with the highest output voltage among the linear regulators 104 or any other of the linear regulators.

The linear regulators 104 may include LDO regulators, for example, as further described herein with respect to FIG. 2. Each of the linear regulators 104 may have an internal input 112 coupled to one of the internal outputs 108 of the voltage reference circuit 102. Each of the linear regulators 104 may have external outputs 114 at various power supply rail voltages. In aspects, the external outputs 114 may be coupled to various voltage rails, such as digital voltage rails (e.g., the external outputs 114 of linear regulators 104a, 104b, labeled "DVDD"), analog voltage rails (e.g., the external outputs 114 of linear regulators 104e, 104f, 104g, labeled "AVDD"), or I/O rails (e.g., the external outputs 114 of linear regulators 104c, 104d). As an example, the external outputs 114 of linear regulators 104a, 104b may be coupled to digital circuitry such as a processor (e.g., a digital signal processor), modem, memory device, etc. The external outputs 114 of linear regulators 104e, 104f, 104g may be coupled to analog circuitry such as analog components of an RF transceiver including filters, amplifiers, mixers, frequency synthesizers, etc. The external outputs 114 of linear regulators 104c, 104d may be coupled to an output voltage of an I/O interface, such as a reference voltage across an I/O bus.

In certain aspects, capacitive elements 116 may be coupled between a reference potential node 118 (e.g., a ground potential) and the external outputs 114 of the linear regulators 104, as well as the external output 110 of the voltage reference circuit 102. The capacitive elements 116 may serve as decoupling capacitors to provide a consistent voltage from the linear regulators 104 and reduce or filter out any noise from the linear regulators 104. Each of the capacitive elements 116 may include one or more capacitors, such as a tantalum capacitor, aluminum capacitor, ceramic capacitor, a metal-insulator-metal (MIM) capacitor, metal-oxide-metal (MOM) capacitor, a metal-oxide-semiconductor (MOS) capacitor, a metal fringe capacitor, a trench capacitor, a junction capacitance of a diode or transistor, a varactor, or the like.

In certain aspects, the capacitive elements 116 may be coupled externally to the power management circuit 100. For example, the capacitive elements 116 may be surface mount capacitors coupled to the power management circuit 100 via an interposer such as a package substrate, redistribution layer, circuit board, or a motherboard.

The other components and resources 106 may include other modules that provide various functions of the power management circuit 100. For example, the other components and resources 106 may include one or more processors or controllers, a real-time clock, a voltage rail (VDD_GEN) generator, power-on circuitry, power drivers for various user interfaces (e.g., a vibration motors, joysticks, light-emitting diodes (LEDs), etc.), input power management (e.g., power source selection, battery charging, and battery monitoring), a switched-mode power supply (SMPS), or the like.

Those of skill in the art will understand that the voltages and the number of linear regulators illustrated in FIG. 1 are merely examples. A different number of linear regulators may be used in addition to or instead of those illustrated, and different voltages may be used instead of those illustrated.

FIG. 2 is a diagram illustrating an example voltage reference circuit 102 coupled to the linear regulators 104, in accordance with certain aspects of the present disclosure. In aspects, a power management circuit (such as the power management circuit 100) may include the voltage reference circuit 102 depicted in FIG. 2. As shown, the voltage reference circuit 102 may include a reference current source 220 (labeled as IREF_GEN), a resistor ladder 222, and multiplexers 224.

The reference current source 220 may have an output 226 coupled to the resistor ladder 222. In aspects, the reference current source 220 may include various circuitry to output a reference current, which due to the resistor ladder 222 provides various reference voltages. As an example, the reference current source 220 may include a bandgap voltage reference circuit, a voltage-to-current converter, and a current mirror, for example, as described herein with respect to FIG. 3. In certain aspects, the output 226 may correspond to the external output 110 of the voltage reference circuit 102 as depicted in FIG. 1. That is, the voltage at the output 226 may be shorted to the external output 110.

The resistor ladder 222 may comprise a plurality of resistive elements 228 coupled in series between the output 226 of the reference current source 220 and a reference potential node 230 (e.g., a ground potential) of the voltage reference circuit 102. Each of the resistive elements 228 may be a resistor with the same or varying electrical resistance as the other resistive elements 228. In aspects, the resistance of the resistive elements 228 may be selected to provide one or more voltage drops along the resistor ladder 222 that match with the various output voltages of the linear regulators 104, for example, as further described herein with respect to FIG. 3.

The multiplexers 224 have inputs 232 coupled to nodes 254 (also referred to as taps) between the resistive elements 228 and, in some cases, to the output 226 of the reference current source 220. Each of the multiplexers 224 has an output 234 selectively coupled to one of the inputs 232 of the respective multiplexer 224. Each of the inputs 236 of the linear regulators 104 is coupled to one of the outputs 234 of the multiplexers 224. In aspects, the outputs 234 of the multiplexers 224 may correspond to the internal outputs 108 of the reference voltage circuit 102 as shown in FIG. 1, and the inputs 236 of the linear regulators 104 may correspond to the internal inputs 112 of the linear regulators 104 as shown in FIG. 1. The multiplexers 224 may enable the selection of a specific reference voltage along the resistor ladder 222 or at the output 226 of the reference current source 220 to the linear regulators 104. The voltage output at the multiplexers 224 may match the voltage output by the linear regulators 104. As an advantage, there may be no amplifier coupled between the output 226 of the reference current source 220 and the linear regulator 104, which may lead to reducing noise at the output of the linear regulator 104 by eliminating noise contributed by an amplifier preceding the linear regulator.

Each of the linear regulators 104 may be implemented as an LDO voltage regulator. In certain aspects, the LDO regulator may be in a unity-gain configuration. The linear regulator 104 may include an amplifier 238 and a power transistor 240. The amplifier 238 may have an output 242 coupled to a control input 244 of the power transistor 240. A first input 246 (e.g., a negative terminal) of the amplifier 238 may be coupled to the input 236 of the linear regulator 104, and a second input 248 (e.g., a positive terminal) of the amplifier 238 may be coupled to the drain 250 of the power transistor 240 and the output 114 of the linear regulator 104. In aspects, the source 252 of the power transistor 240 and the power supply input (not shown) of the amplifier 238 may be coupled to a power rail.

In certain aspects, the output 226 of the reference current source 220 may be configured (in conjunction with the resistor ladder 222) to have a voltage that matches an output voltage of at least one of the linear regulators 104, such as the linear regulator 104 with the highest output voltage. In certain cases, the voltage at the output 226 of the reference current source 220 may be shorted to the external output 110 (as shown in this example) or adjusted by the resistor ladder 222 as further described herein with respect to FIG. 4.

Figure 3:
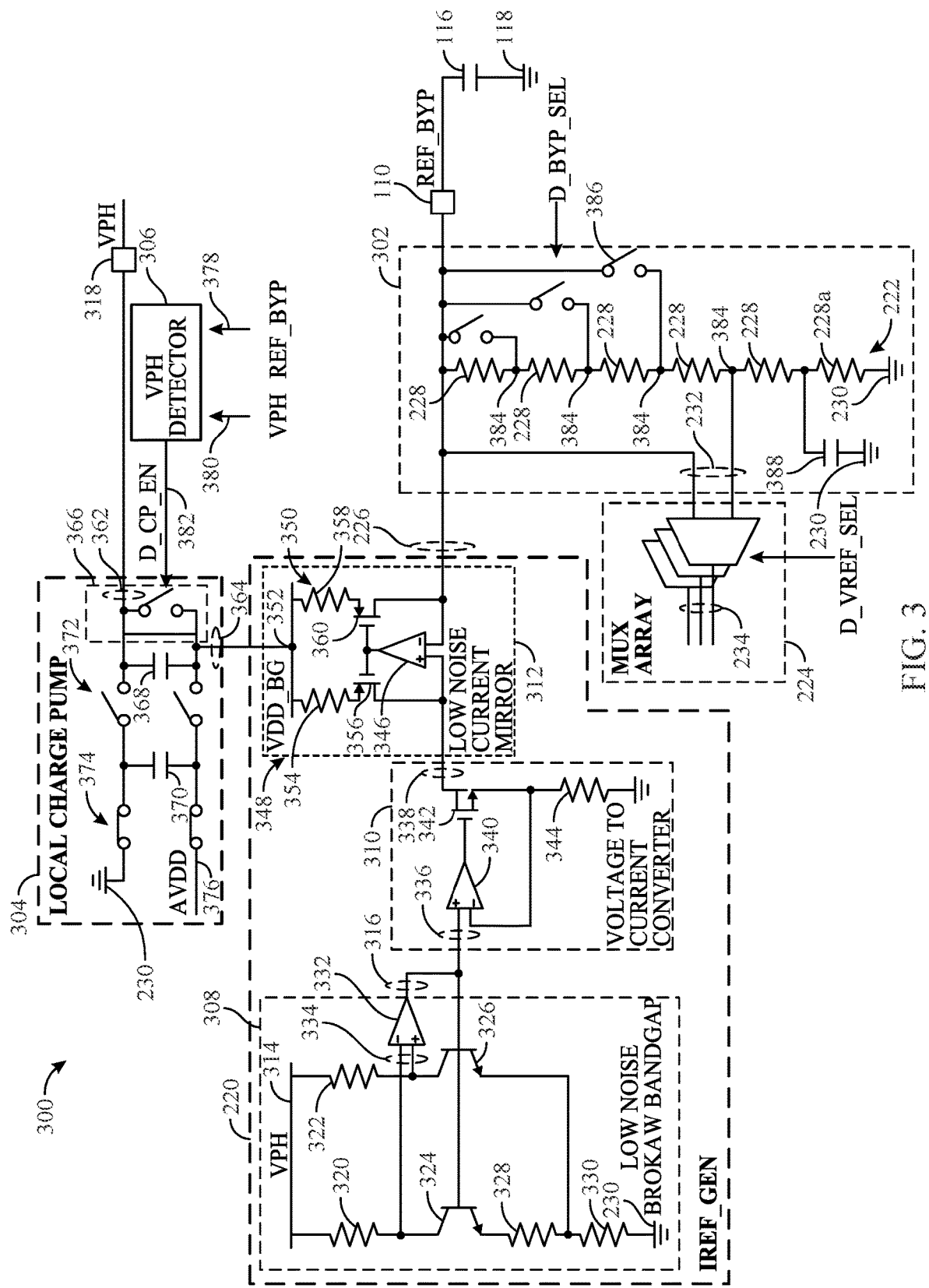
FIG. 3 is a diagram illustrating an example voltage reference circuit, in accordance with certain aspects of the present disclosure

FIG. 3 is a diagram illustrating an example voltage reference circuit 300, in accordance with certain aspects of the present disclosure. In aspects, the voltage reference circuit 300 may be implemented in a power management circuit (such as the power management circuit 100). The voltage reference circuit 300 may include the various components of the voltage reference circuit 102 described herein with respect to FIG. 2 as well as an RC network 302, a charge pump circuit 304, and a voltage detector circuit 306.

The reference current source 220 may include a bandgap voltage reference circuit 308, a voltage-to-current converter circuit 310, and a current mirror circuit 312. The bandgap voltage reference circuit 308 may include a low noise reference voltage circuit such as a Brokaw bandgap voltage reference circuit or other suitable bandgap voltage reference circuits, such as a temperature-independent bandgap voltage reference. The bandgap voltage reference circuit 308 may have a power rail input 314 and an output 316. In aspects, the power rail input 314 of the bandgap voltage reference circuit 308 may be coupled to a first voltage rail 318, which may be a voltage rail from a power supply such as a battery or other power source (e.g., wall adapter or battery charger).

As an example, the bandgap voltage reference circuit 308 may include a first resistor 320, a second resistor 322, a first transistor 324, a second transistor 326, a third resistor 328, a fourth resistor 330, and an amplifier 332. In this example, the first and second transistors 324, 326 may be npn bipolar junction transistors (BJTs). The first and second resistors 320, 322 may be separately coupled between the power rail input 314 and one of the inputs 334 of the amplifier 332. The first and second resistors 320, 322 may also be respectively coupled to the collectors of the first and second transistors 324, 326, which may also be respectively coupled to the inputs 334 of the amplifier 332. The third and fourth resistors 328, 330 may be coupled in series between the emitter of the first transistor 324 and the reference potential node 230. More specifically, the third resistor 328 may be coupled to the emitter of the first transistor 324, and the fourth resistor 330 may be coupled to the emitter of the second transistor 326, such that the emitter of the second transistor 326 is coupled to a node between the third and fourth resistors 328, 330. The bases of the first and second transistors 324, 326 may be coupled to the output 316 of the amplifier 332, which corresponds to the output 316 of the bandgap voltage reference circuit 308.

The voltage-to-current converter circuit 310 may have an input 336 coupled to the output 316 of the bandgap voltage reference circuit 308, and the voltage-to-current converter circuit 310 may have an output 338 coupled to the current mirror circuit 312. As an example, the voltage-to-current converter circuit 310 may include an amplifier 340, a transistor 342, and a resistor 344. The transistor 342 may be an n-type field-effect transistor (NFET), as shown. One of the inputs to the amplifier 340 may correspond to the input of the voltage-to-current converter circuit 310, and the other input of the amplifier 340 may be coupled between the source of the transistor 342 and the resistor 344. The output of the amplifier 340 may be coupled to the gate of the transistor 342, and the drain of the transistor 342 may serve as the output 338 of the voltage-to-current converter circuit 310.

The current mirror circuit 312 may have an amplifier 346, a first branch 348, and a second branch 350. The first branch 348 may be coupled between a node 352 and the output 338 of the voltage-to-current converter circuit 310, and the second branch 350 may be coupled between the node 352 and the output 226 of the reference current source 220. The voltage at the output 226 may represent the highest reference voltage supplied to at least one of the multiplexers 224 and sent to one of the linear regulators. The voltage at the output 226 may be selected by digital logic or a processor/controller of a PMIC based on the highest voltage settings among the linear regulators. The first branch 348 may include a first resistor 354 and a first transistor 356, and the second branch 350 may include a second resistor 358 and a second transistor 360. The first and second transistors 356, 360 may be implemented with p-type field-effect transistors (PFETs), as depicted in FIG. 3. The first resistor 354 may be coupled between the node 352 and the source of the first transistor 356, and the second resistor 358 may be coupled between the node 352 and the source of the second transistor 360. The gates of the first and second transistors 356, 360 may be coupled to the output of the amplifier 346, and the inputs of the amplifier 346 may be coupled to the respective drains of the first and second transistors 356, 360.

The bandgap voltage reference circuit 308 may provide a low noise reference voltage to the voltage-to-current converter circuit 310. The voltage-to-current converter circuit 310 may generate a reference current along the first branch 348 of the current mirror circuit 312 to allow a specific output current to be generated along the second branch 350, depending on the geometries of the first and second transistors 356, 360. In certain cases, the first and second transistors 356, 360 may have identical geometries such that the current along the second branch 350 replicates or mirrors the reference current along the first branch 348. In certain cases, due to differences in geometries (such as the geometries of the channel regions of the first and second transistors 356, 360), the current along the second branch 350 may be proportional to the reference current along the first branch 348, for example.

The charge pump circuit 304 along with the voltage detector circuit 306 may use capacitors to raise the voltage of the node 352 (labeled "VDD_BG"), when the voltage of the first voltage rail 318 (labeled "VPH") is less than or equal to a certain threshold voltage. The charge pump circuit 304 may have an input 362 coupled to the first voltage rail 318 and an output 364 coupled to the node 352. The charge pump circuit 304 may also include a bypass switch 366, capacitive elements (such as a first capacitive element 368 and a second capacitive element 370), and pairs of switches (such as a first pair of switches 372 and a second pair of switches 374). The bypass switch 366 is coupled between the input 362 of the charge pump circuit 304 and the output 364 of the charge pump circuit 304. The first capacitive element 368 is coupled in parallel with the bypass switch 366. The first pair of switches 372 are coupled between the first capacitive element 368 and the second capacitive element 370. The second pair of switches 374 are coupled between the second capacitive element 370 and a voltage source, which is coupled between a second voltage rail 376 and the reference potential node 230. In aspects, the second voltage rail 376 may be an analog voltage rail (e.g., AVDD).

The voltage detector circuit 306 may have a first input 378 coupled to a threshold voltage source (e.g., the output 226 of the reference current source 220), a second input 380 coupled to the first voltage rail 318, and an output coupled to a control input of the bypass switch 366. The voltage detector circuit 306 may be configured to open the bypass switch 366 if a voltage at the first voltage rail 318 is less than or equal to a threshold voltage of the threshold voltage source and configured to close the bypass switch 366 if the voltage is greater than the threshold voltage. In certain aspects, the threshold voltage source may include the output 226 of the reference current source 220, the external output 110, or other suitable threshold voltages, such as the voltage at the output 226 of the reference current source 220 or the external output 110 plus a certain offset voltage. An offset voltage applied to the voltage at the output 226 of the reference current source 220 or the external output 110 may provide the current mirror circuit 312 with enough headroom to operate in mirroring the current output by the voltage-to-current converter circuit 310. When open, the bypass switch 366 may enable the charge pump circuit 304 to extend the voltage headroom of a reference voltage supplied to the current mirror circuit 312 at the node 352. For example, the charge pump circuit 304 may extend the headroom voltage when the voltage at the first voltage rail 318 is low (e.g., <3.2 V). With the charge pump circuit 304, the voltage at the node 352 may be the voltage at the first voltage rail 318 boosted by the voltage at the second voltage rail 376 (e.g., VPH+AVDD). When the voltage at the first voltage rail is high (e.g., >3.2 V), the bypass switch 366 may short the first voltage rail 318 to the node 352.

In certain aspects, the bypass switch 366 may be hardware controlled via the voltage detector circuit 306. For example, the voltage detector circuit 306 may include a voltage comparator, which opens the bypass switch 366 if the voltage at the first voltage rail 318 is less than or equal to a threshold voltage of the threshold voltage source. In certain aspects, the bypass switch 366 may be software controlled via a processor (not shown), such as a processor or controller integrated with a power management circuit.

In aspects, the inputs 232 of the multiplexers 224 may be coupled to one or more nodes 384 between the plurality of resistive elements 228 and, in some cases, to the output 226 of the reference current source 220. Although only one node 384 is depicted as being coupled to an input 232a of the multiplexers 224, various inputs 232 of the multiplexers may be coupled to other nodes 384. The resistance of the resistive elements 228 may be selected to provide one or more voltage drops at nodes 384 along the resistor ladder 222 that match the various output voltages of the linear regulators. A multiplexer 224 may be used to select a reference voltage among one or more voltages along the resistor ladder 222 and/or the output 226 of the reference current source 220 to output to a linear regulator. In other words, a multiplexer 224 may enable a specific linear regulator to output a certain voltage among a range of voltages depending on the selection of the reference voltage along the resistor ladder 222 by the multiplexer 224.

The resistor ladder 222 may be coupled between the output 226 of the reference current source 220 and the reference potential node 230 for the voltage reference circuit 300. In certain cases, one or more switches 386 may be coupled between the output 226 of the reference current source 220 and the one or more nodes 384 between the resistive elements 228. The switches 386 may be used to select which tapping point among the nodes 384 will be effectively shorted to the output 226, thereby changing the overall effective resistance of the resistor ladder 222 and consequently changing the voltage at the output 226. In addition, the voltages at the various nodes 384 may be adjusted along the resistor ladder 222 enabling variable voltages at the inputs 232 of the multiplexers 224. By shorting out certain resistive elements 228 with the switches 386, the thermal noise contributions from the shorted out resistive elements 228 can also be eliminated. In aspects, the switches 386 may be used to select a tapping point (e.g., one of the nodes 384) along the resistor ladder 222 to provide a variable RC network with the capacitive element 116 (referred to as the first capacitive element in this example). In other words, the first capacitive element 116 and a portion of the resistor ladder 222 as selected by one of the switches 386 may serve as an RC network to reduce or eliminate noise, such as noise output from the reference current source 220 and/or thermal noise generated by the resistor ladder 222 and/or multiplexers 224. In aspects, the first capacitive element 116 may have a first terminal coupled to the output 226 of the reference current source 220 and a second terminal coupled to the reference potential node 118. The first capacitive element 116 may be coupled externally to a chip in which the voltage reference circuit 300 is integrated. In certain aspects, the external output 110 may provide the lowest noise point of the voltage reference circuit 300 due to the direct connection with the first capacitive element 116.

In certain aspects, the RC network 302 may be an on-chip RC network. For example, the voltage reference circuit 300 may include a second capacitive element 388 coupled in parallel with one of the plurality of resistive elements 228 at an end of the resistor ladder 222 that is coupled to the reference potential node 230 for the voltage reference circuit 300 (i.e., the second capacitive element 388 may be coupled in parallel with the bottommost resistive element 228 in the resistor ladder 222). In aspects, the second capacitive element 388 may reduce noise, such as noise output from the reference current source 220 and/or thermal noise generated by the resistor ladder 222 and/or multiplexers 224. For example, the second capacitive element 388 may specifically reduce thermal noise from the resistive element 228a, which may be a major contributor to thermal noise along the resistor ladder 222. In certain aspects, the second capacitive element 388 may be integrated with the chip that includes the voltage reference circuit 300, such as a PMIC. The second capacitive element 388 may include one or more capacitors, such as a tantalum capacitor, aluminum capacitor, ceramic capacitor, a MIM capacitor, MOM capacitor, a MOS capacitor, a metal fringe capacitor, a trench capacitor, a junction capacitance of a diode or transistor, a varactor, or the like. In aspects, a MOS capacitor may use a low area to realize low noise at a specific voltage level output along the resistor ladder 222 and tapped by an input 232 of at least one of the multiplexers 224.

In this example, the output 226 of the reference current source 220 may be shorted to the external output 110 of the voltage reference circuit 300, such that the external output 110 provides the same potential as the output 226 of the reference current source 220. In certain cases, additional switches may be arranged along the resistor ladder, as further described herein with respect to FIG. 4, to enable separate adjustment of the voltage at the output 226, voltages at the nodes 384, and/or the voltage at the external output 110.

In certain aspects, a PMIC may include the voltage reference circuit 300. Various portable computing devices (such as cellphone, a smartphone, tablet, digital camera, smart watch, laptop computer, etc.) may also include a voltage reference circuit, such that the output of one of the multiplexers may be coupled to an input of a voltage regulator having an output coupled to a power rail of the portable computing device. An example portable computing device is further described herein with respect to FIGS. 6 and 7. In certain cases, the portable computing device may include a noise sensitive circuit coupled to the output of the voltage regulator, where the noise sensitive circuit may be a SoC, a processor (e.g., an application processor, modem processor, a display processor, a digital signal processor, or an image processor), a memory device (such as dynamic random access memory (DRAM) or a memory controller), an RF transceiver circuit (such as 5G RF transceiver operable in the mmWave bands), or a camera sensor (such as 100+ megapixel camera sensors).

Figure 4:
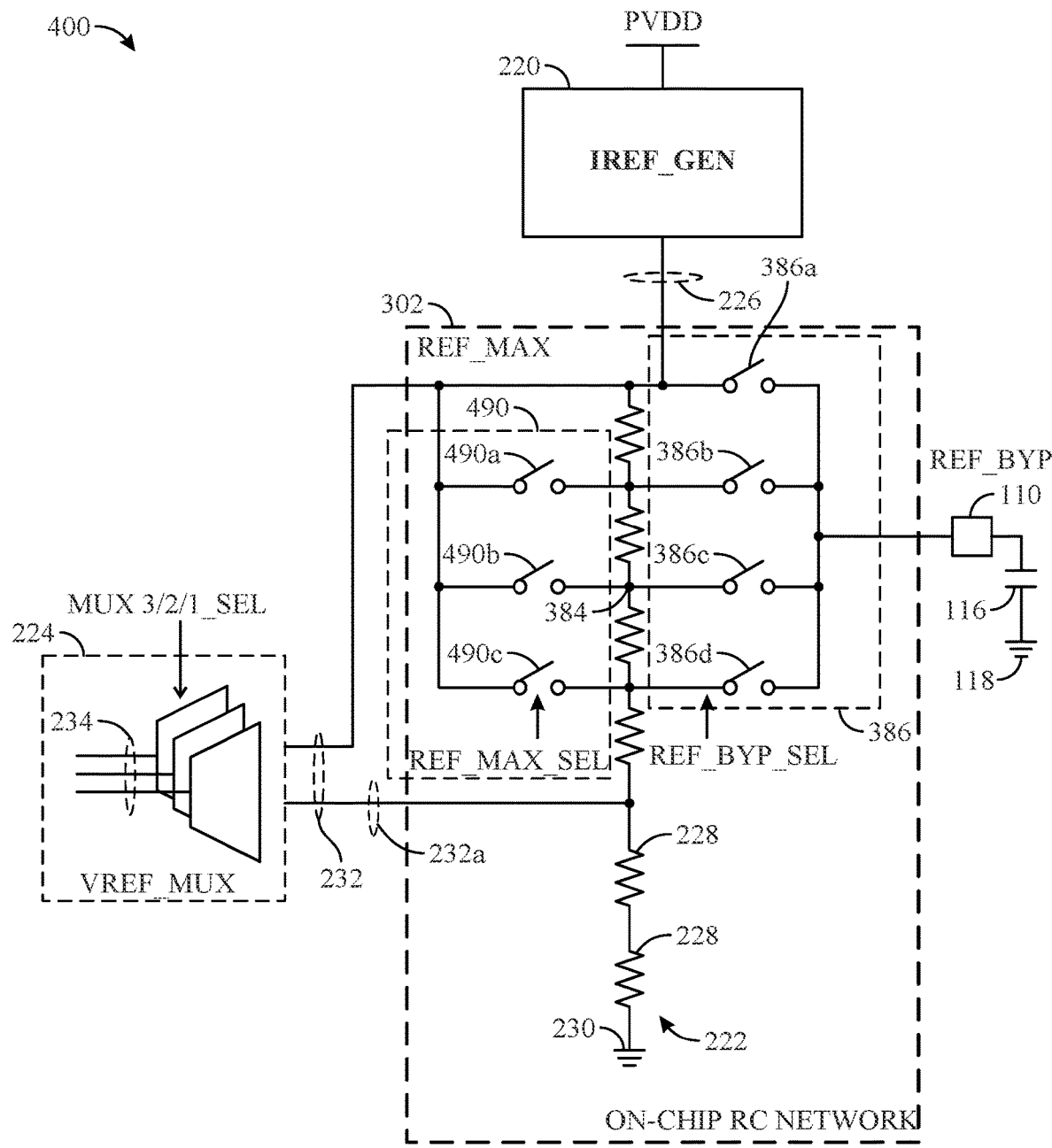
FIG. 4 is a diagram illustrating another example voltage reference circuit, in accordance with certain aspects of the present disclosure.

In certain aspects, the voltage reference circuit may include an additional set of switches arranged between the nodes of the resistor ladder and the output of the current reference source. For example, FIG. 4 is a diagram illustrating an example voltage reference circuit 400, in accordance with certain aspects of the present disclosure. As shown, the switches 386 (referred to as the first switches 386 in this example) may be coupled between the external output 110 of the voltage reference circuit 400 and the nodes 384 along the resistor ladder 222. One of the first switches 386 may also be coupled to the output 226 of the reference current source 220 and the external output 110. Such an arrangement of the first switches 386 may enable a variable selection of the potential at the external output 110, such that the potential at the external output 110 may be selected to be (via the first switches 386) the highest voltage at the output 226 of the reference current source 220 or a lower voltage at one of the nodes 384 along the resistor ladder 222. Suppose, for example, that the first switches 386a, 386c, 386d are open, and that the first switch 386b is closed. The potential at the external output 110 will be the voltage at the node 384 coupled to the first switch 386b, rather than the voltage at the output 226 of the reference current source 220.

In certain aspects, the voltage reference circuit 400 may also include one or more second switches 490 coupled between the output 226 of the reference current source 220 and the nodes 384. The second switches 490 may enable the selection of the voltage encountered at one of the nodes 384 coupled to an input of the multiplexers 224. That is, the second switches 490 may enable an additional layer of adjustment of the voltages supplied to a linear regulator via the multiplexers 224. The second switches 490 may enable separation of the output 226 from the external output 110. For example, suppose the second switches 490a, 490c are open; the second switch 490b is closed; the first switches 386a, 386b, 386c are closed; and the first switch 386d is closed. In such a configuration, the voltage at the output 226 may be 2.9V, and the voltage at the external output 110 may be 2.8V, which will have the lowest noise. In other words, the second switches 490 may enable the selection of the highest voltage available at the output 226 to be applied to a particular node 384 along the resistor ladder 222, which may correspond to particular reference voltage of one or more of the linear regulators through the multiplexers 224. The first switches 386 may enable the selection of which of the voltages along the resistor ladder 222 (i.e., which of the nodes 384) has the lowest noise due to the capacitive coupling of the first capacitive element 116.

In certain aspects, the voltage detector circuit 306 may detect the voltage at the output 226 (e.g., REF MAX) instead of the voltage at the external output 110. The voltage at the output 226 may enable the voltage detector circuit 306 to compare the voltage at the first voltage rail 318 with the highest available voltage at output 226.

Figure 5:
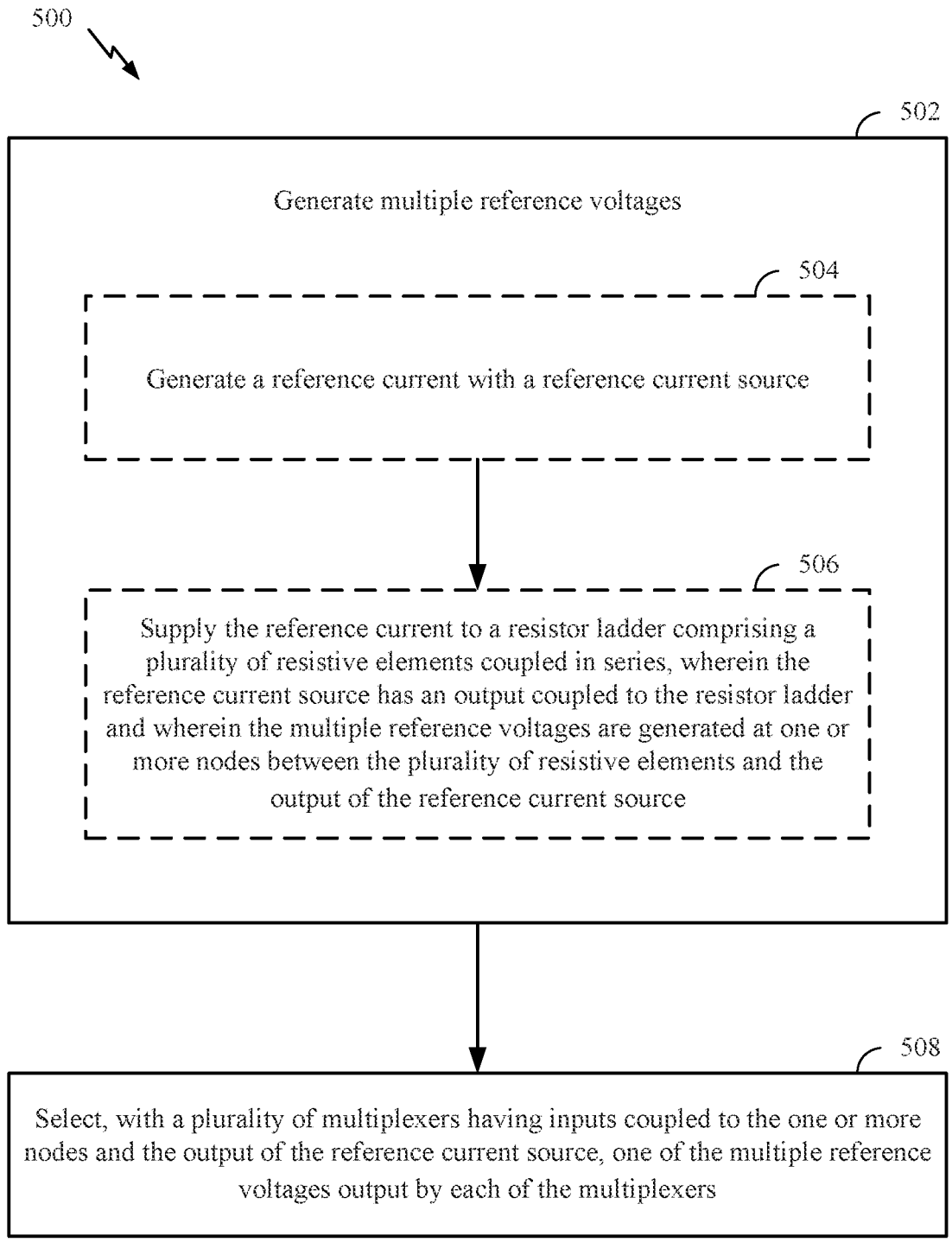
FIG. 5 is a flow diagram of example operations for supplying power, in accordance with certain aspects of the present application.

FIG. 5 is a flow diagram of example operations 500 for supplying power, in accordance with certain aspects of the present disclosure. The operations 500 may be performed by a PMIC such as the power management circuit 100 or a voltage reference circuit, such as the voltage reference circuit 102, 300, or 400.

The operations 500 may begin at block 502, where a circuit (e.g., the power management circuit 100 or the voltage reference circuit 102, 300, 400) may generate multiple reference voltages. In aspects, the generation of multiple reference voltages at block 502 may include the circuit generating a reference current with a reference current source at block 504. The generation of multiple reference voltages at block 502 may also include the circuit supplying the reference current to a resistor ladder at block 506, where the resistor ladder comprises a plurality of resistive elements coupled in series. The reference current source may have an output coupled to the resistor ladder, and the multiple reference voltages may be generated at one or more nodes between the plurality of resistive elements and the output of the reference current source. At block 508, the circuit may select, with a plurality of multiplexers having inputs coupled to the one or more nodes and the output of the reference current source, one of the multiple reference voltages output by each of the multiplexers.

In certain cases, the output of the reference current source may have a voltage that matches an output voltage of at least one voltage regulator coupled to at least one of the multiplexers.

In certain cases, the circuit may selectively apply a charge pump to locally step-up a voltage at a voltage rail coupled to the reference current source. For example, the circuit may select to apply a voltage, which is output with a charge pump circuit, to the reference current source if a voltage at a voltage rail is less than or equal to a threshold voltage.

In certain cases, the circuit may select a tapping point along the resistor ladder to adjust an RC network coupled to the output of the reference current source. For example, the circuit may select a tapping point among the one or more nodes and the output of the reference current source to couple a first terminal of a first capacitive element, wherein a second terminal of the first capacitive element is coupled to a reference potential node.

In certain cases, an on-chip RC network may be coupled along the resistor ladder. For example, the circuit may couple a second capacitive element in parallel with one of the plurality of resistive elements at an end of the resistor ladder that is coupled to the reference potential node.

Based on the present disclosure, it should be appreciated that the various circuits (a PMIC or voltage reference circuit) and the method of supplying power enable a low noise DC supply voltage provide various advantages. For example, the various circuits and method described herein may facilitate the noise encountered at the output of LDO regulators in a PMIC to be less than 7 μVrms at frequencies of 10 Hz to 100 kHz. The low noise provided by the various circuits and methods described herein may be desirable for various noise sensitive circuits, such as RF transceivers operating in the mmWave band and 100+ megapixel camera sensors. The various circuits described herein may provide other advantages such as an area reduction of the integrated circuit implementing the voltage reference architecture and the elimination or reduction in calibration testing of the circuit.

Figure 6:
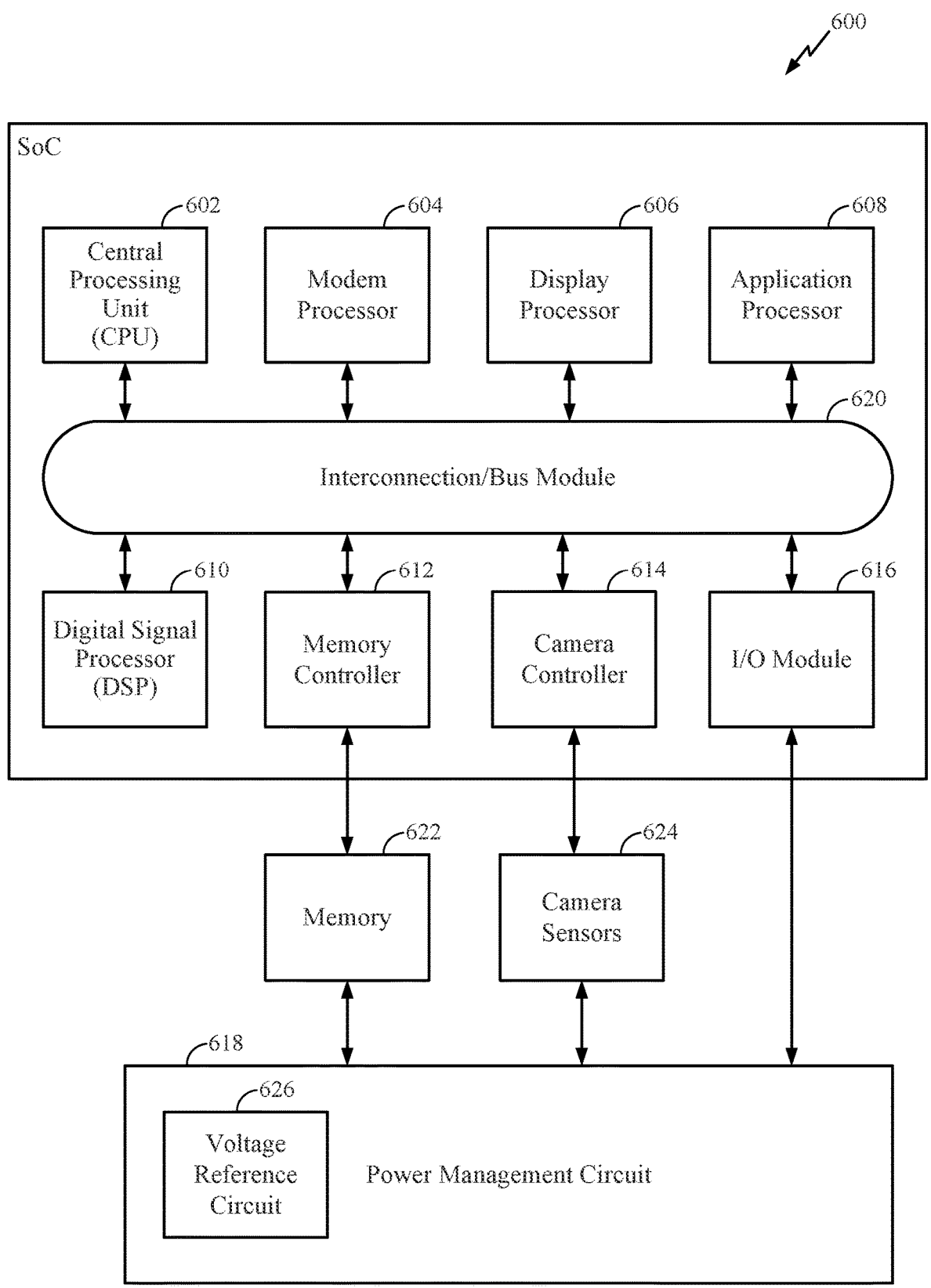
FIG. 6 is a block diagram of example components and interconnections in a System-on-a-Chip (SoC), in accordance with certain aspects of the present disclosure.

In certain aspects, the various power/voltage circuits described herein may be used to provide a low noise DC supply voltage to various noise sensitive circuits, such as a SoC. FIG. 6 is a block diagram of example components and interconnections in a SoC 600 suitable for implementing various aspects of the present disclosure. The SoC 600 may include a number of heterogeneous processors, such as a central processing unit (CPU) 602, a modem processor 604, a display processor 606 (e.g., a graphics processing unit (GPU) or graphics processor), an application processor 608, and a digital signal processor 610. Each processor 602, 604, 606, 608, 610, may include one or more cores, and each processor/core may perform operations independent of the other processors/cores. Each processor 602, 604, 606, 608, 610 may be part of a subsystem (not shown) including one or more processors, caches, etc. configured to handle certain types of tasks or computations. It should be noted that SoC 600 may include additional processors (not shown) or may include fewer processors (not shown).

The SoC 600 may further include one or more memory controllers 612 (e.g., a dynamic random access memory (DRAM) memory controller), one or more camera controllers 614, and an input/output (I/O) module 616. The I/O module 616 may enable communication with resources external to the SoC 600, such as a clock (not shown) and/or a power management circuit 618, each of which may be shared by two or more of the internal SoC components.

The processors 602, 604, 606, 608, 610 may be interconnected to each other and other system components (e.g., the memory controller 612, camera controller 614, and the I/O module 616) via an interconnection/bus module 620, which may include an array of reconfigurable logic gates and/or implement a bus architecture (e.g., CoreConnect, AMBA, etc.). Communications may also be provided by advanced interconnects, such as high performance networks-on-chip (NoCs).

The interconnection/bus module 620 may include or provide a bus mastering system configured to grant SoC components (e.g., processors, peripherals, etc.) exclusive control of the bus (e.g., to transfer data) for a set duration, number of operations, number of bytes, etc. In an aspect, the bus module 620 may include a direct memory access (DMA) controller (not shown) that enables components connected to the bus module 620 to operate as a master component and initiate memory transactions. The bus module 620 may also implement an arbitration scheme to prevent multiple master components from attempting to drive the bus simultaneously.

The memory controller 612 may be a specialized hardware module configured to manage the flow of data to and from a memory 622. The memory controller 612 may include logic for interfacing with the memory 622, such as selecting a row and column in a cell array of the memory 622 corresponding to a memory location, reading or writing data to the memory location, etc. The memory 622 may be an on-chip component (e.g., integrated with a substrate, die, chip, chip package (such as a package-on-package (PoP)), etc.) of the SoC 600, or alternatively (as shown) an off-chip component (e.g., coupled to the SoC via a package substrate, circuit board, or motherboard).

The camera controller 614 may be a specialized hardware module configured to manage the state of camera sensors 624, such as single camera mode, dual camera mode, and video capture mode. The camera controller 614 may include an image signal processor for hardware accelerated computer vision, video codecs, and image codecs.

The power management circuit 618 may provide low noise DC power rails to the SoC 600 and other components (such as the memory 622 and camera sensors 624). In certain aspects, the power management circuit 618 may include a voltage reference circuit 628, for example, as described herein with respect to FIGS. 1-4. In aspects, the voltage reference circuit 628 may enable low noise reference voltages for linear regulators to supply power rail voltages to various noise sensitive circuits, such as the SoC 600, memory 622, and/or camera sensors 624. The power management circuit 618 may be an on-chip component (e.g., integrated with a substrate, die, chip, chip package, etc.) of the SoC 600 or alternatively (as shown) an off-chip component (e.g., coupled to the SoC via a package substrate, circuit board, or motherboard).

The SoC 600 may include further other system components and resources (not shown) for managing sensor data, analog-to-digital conversions, wireless data transmissions, and for performing other specialized operations (e.g., decoding high-definition video, video processing, etc.). System components and resources may also include components such as voltage regulators, oscillators, phase-locked loops, peripheral bridges, data controllers, system controllers, access ports, timers, and other similar components used to support the processors and software clients running on the computing device. The system components and resources may also include circuitry for interfacing with peripheral devices, such as cameras, electronic displays, wireless communication devices, external memory chips, etc.

Figure 7:
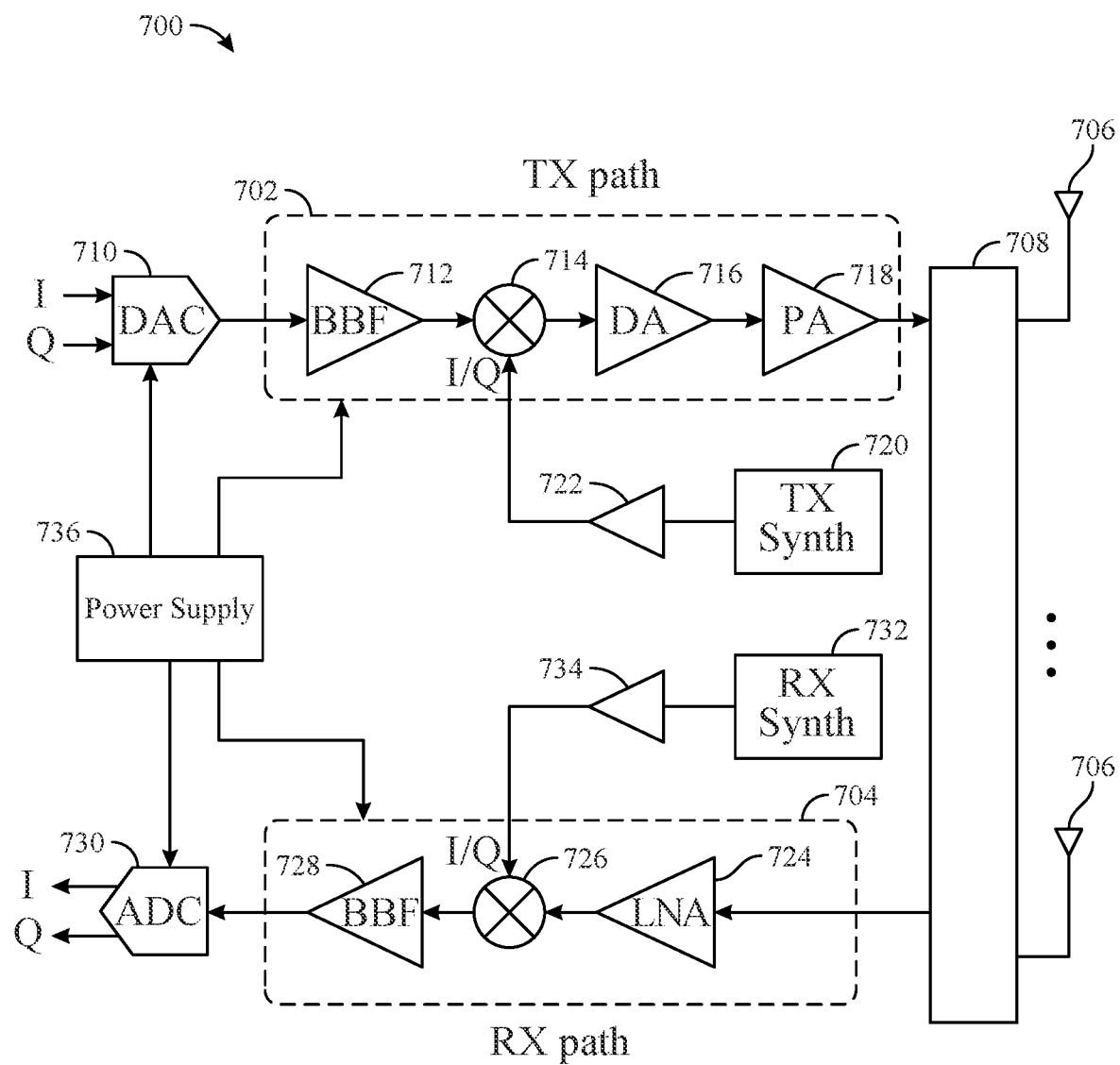
FIG. 7 is a block diagram of an example radio frequency (RF) transceiver circuit, in accordance with certain aspects of the present disclosure.

In certain aspects, the various power/voltage circuits described herein may be employed in powering a noise sensitive circuit such as an RF transceiver. FIG. 7 is a block diagram of an example RF transceiver circuit 700, in accordance with certain aspects of the present disclosure. The RF transceiver circuit 700 includes at least one transmit (TX) path 702 (also known as a transmit chain) for transmitting signals via one or more antennas 706 and at least one receive (RX) path 704 (also known as a receive chain) for receiving signals via the antennas 706. When the TX path 702 and the RX path 704 share an antenna 706, the paths may be connected with the antenna via an interface 708, which may include any of various suitable RF devices, such as a switch, a duplexer, a diplexer, a multiplexer, and the like.

Receiving in-phase (I) or quadrature (Q) baseband analog signals from a digital-to-analog converter (DAC) 710, the TX path 702 may include a baseband filter (BBF) 712, a mixer 714, a driver amplifier (DA) 716, and a power amplifier (PA) 718. The BBF 712, the mixer 714, the DA 716, and the PA 718 may be included in a radio frequency integrated circuit (RFIC). In other cases, the PA 718 may be external to the RFIC.

The BBF 712 filters the baseband signals received from the DAC 710, and the mixer 714 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 714 are typically RF signals, which may be amplified by the DA 716 and/or by the PA 718 before transmission by the antenna 706.

The RX path 704 may include a low noise amplifier (LNA) 724, a mixer 726, and a baseband filter (BBF) 728. The LNA 724, the mixer 726, and the BBF 728 may be included in a RFIC, which may or may not be the same RFIC that includes the TX path components. RF signals received via the antenna 706 may be amplified by the LNA 724, and the mixer 726 mixes the amplified RF signals with a receive local oscillator (LO) signal to convert the RF signal of interest to a different baseband frequency (e.g., downconvert). The baseband signals output by the mixer 726 may be filtered by the BBF 728 before being converted by an analog-to-digital converter (ADC) 730 to digital I or Q signals for digital signal processing.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 720, which may be buffered or amplified by amplifier 722 before being mixed with the baseband signals in the mixer 714. Similarly, the receive LO may be produced by an RX frequency synthesizer 732, which may be buffered or amplified by amplifier 734 before being mixed with the RF signals in the mixer 726. For certain aspects, a single frequency synthesizer may be used for both the TX path 702 and the RX path 704.

In aspects, a power supply circuit 736 may provide low noise DC voltage rails to various analog or digital components of the RF transceiver circuit 700, such as the DAC 710, components in or coupled to the TX path 702, and components in or coupled to the RX path 704. In certain cases, the power supply circuit 736 may include the voltage reference circuits to provide a low noise reference voltage for linear regulators in the power supply circuit 736.

In certain aspects, the various power/voltage circuits described herein may be employed in powering noise sensitive circuits implemented in a portable computing device.

Figure 8:
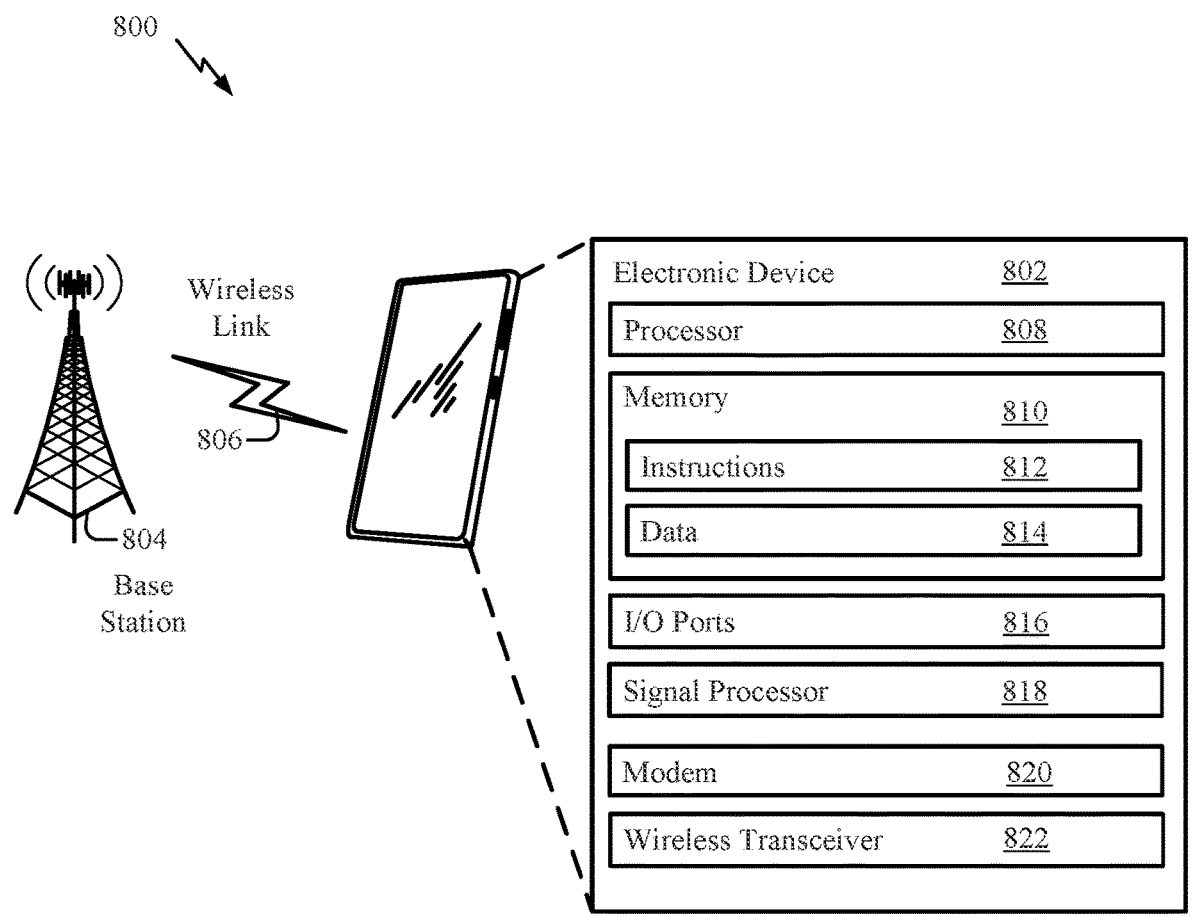
FIG. 8 is a diagram of an environment that includes a wireless communication device, in accordance with certain aspects of the present disclosure.

FIG. 8 is a diagram of an environment 800 that includes a wireless communication device 802, which has a wireless transceiver 822 such as the RF transceiver circuit 700 of FIG. 7. In the environment 800, the wireless communication device 802 communicates with a base station 804 through a wireless link 806. As shown, the wireless communication device 802 is depicted as a portable computing device such as a smart phone. However, the wireless communication device 802 may be implemented as any suitable computing device or other electronic device, such as a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, and so forth.

The base station 804 communicates with the wireless communication device 802 via the wireless link 806, which may be implemented as any suitable type of wireless link. Although depicted as a base station tower of a cellular radio network, the base station 804 may represent or be implemented as another device, such as a satellite, terrestrial broadcast tower, access point, peer-to-peer device, mesh network node, fiber optic line, another electronic device generally as described above, and so forth. Hence, the wireless communication device 802 may communicate with the base station 804 or another device via a wired connection, a wireless connection, or a combination thereof. The wireless link 806 can include a downlink of data or control information communicated from the base station 804 to the wireless communication device 802 and an uplink of other data or control information communicated from the wireless communication device 802 to the base station 804. The wireless link 806 may be implemented using any suitable communication protocol or standard, such as 3rd Generation Partnership Project Long-Term Evolution (3GPP LTE), 3GPP New Radio Fifth Generation (NR 5G), IEEE 802.11 (WiFi), IEEE 802.16 (WiMAX), Bluetooth™, and so forth.

The wireless communication device 802 includes a processor 808 and a memory 810. The memory 810 may be or form a portion of a computer-readable storage medium. The processor 808 may include any type of processor, such as an application processor or a multi-core processor, that is configured to execute processor-executable instructions (e.g., code) stored by the memory 810. The memory 810 may include any suitable type of data storage media, such as volatile memory (e.g., random access memory (RAM)), non-volatile memory (e.g., flash memory), optical media, magnetic media (e.g., disk or tape), and so forth. In the context of this disclosure, the memory 810 is implemented to store instructions 812, data 814, and other information of the wireless communication device 802, and thus when configured as or part of a computer-readable storage medium, the memory 810 does not include transitory propagating signals or carrier waves. That is, the memory 810 may include non-transitory computer-readable media (e.g., tangible media).

The wireless communication device 802 may also include input/output ports 816. The I/O ports 816 enable data exchanges or interaction with other devices, networks, or users or between components of the device.

The wireless communication device 802 may further include a signal processor (SP) 818 (e.g., such as a digital signal processor (DSP)). The signal processor 818 may function similar to the processor 808 and may be capable of executing instructions and/or processing information in conjunction with the memory 810.

For communication purposes, the wireless communication device 802 also includes a modem 820, a wireless transceiver 822, and an antenna (not shown). The wireless transceiver 822 provides connectivity to respective networks and other wireless communication devices connected therewith using RF wireless signals and may include the RF transceiver circuit 700 of FIG. 7. The wireless transceiver 822 may facilitate communication over any suitable type of wireless network, such as a wireless local area network (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

In aspects, the processor 808, memory 810, I/O ports 816, signal processor 818, and modem 820 may be implemented as a SoC, such as the SoC 600.

While FIGS. 6-8 provide example applications (such as a SoC, RF transceiver, or a wireless communication device) in which certain aspects of the present disclosure may be implemented to facilitate understanding, certain aspects described herein related to a low noise voltage reference circuit may be utilized in other suitable electronic systems and/or circuits.

Example Aspects

In addition to the various aspects described above, specific combinations of aspects are within the scope of the disclosure, some of which are detailed below:

Aspect 1: A circuit, comprising: a resistor ladder comprising a plurality of resistive elements coupled in series; a reference current source having an output coupled to the resistor ladder; and a plurality of multiplexers having inputs coupled to one or more nodes between the plurality of resistive elements and the output of the reference current source, each of the multiplexers having an output selectively coupled to one of the inputs of the multiplexer.

Aspect 2: The circuit of aspect 1, further comprising a plurality of voltage regulators having inputs coupled to the outputs of the multiplexers.

Aspect 3: The circuit of aspect 2, wherein the output of the reference current source is configured to have a voltage that matches an output voltage of at least one of the voltage regulators.

Aspect 4: The circuit of aspects 2 or 3, wherein at least one of the voltage regulators comprises a low-dropout (LDO) voltage regulator.

Aspect 5: The circuit of aspect 4, wherein the LDO voltage regulator comprises a power transistor and an amplifier having an output coupled to a control input of the power transistor.

Aspect 6: The circuit of aspect 5, wherein a first input of the amplifier is coupled to an input of the LDO voltage regulator and wherein a second input of the amplifier is coupled to a drain of the power transistor and an output of the LDO voltage regulator.

Aspect 7: The circuit according to any of aspects 1-6, wherein the reference current source comprises: a bandgap voltage reference circuit having an output and having a power rail input coupled to a first voltage rail; a voltage-to-current converter circuit having an output and having an input coupled to the output of the bandgap voltage reference circuit; and a current mirror circuit having a first branch coupled between a node and the output of the voltage-to-current converter circuit and having a second branch coupled between the node and the output of the reference current source.

Aspect 8: The circuit of aspect 7, wherein the bandgap voltage reference circuit includes a Brokaw bandgap voltage reference circuit.

Aspect 9: The circuit of aspects 7 or 8, further comprising a charge pump circuit having an output coupled to the node and having an input coupled to the first voltage rail.

Aspect 10: The circuit of aspect 9, wherein the charge pump circuit comprises: a bypass switch coupled between the input of the charge pump circuit and the output of the charge pump circuit; a first capacitive element coupled in parallel with the bypass switch; a second capacitive element; a first pair of switches coupled between the first capacitive element and the second capacitive element; and a second pair of switches coupled between the second capacitive element and a voltage source coupled between a second voltage rail and a reference potential node.

Aspect 11: The circuit of aspect 10, further comprising a voltage detector circuit having a first input coupled to a threshold voltage source, having a second input coupled to the first voltage rail, and having an output coupled to a control input of the bypass switch.

Aspect 12: The circuit of aspect 11, wherein the voltage detector circuit is configured to open the bypass switch if a voltage at the first voltage rail is less than or equal to a threshold voltage of the threshold voltage source and configured to close the bypass switch if the voltage is greater than the threshold voltage.

Aspect 13: The circuit according to any of aspects 2-6, wherein each of the inputs of the voltage regulators is coupled to one of the outputs of the multiplexers.

Aspect 14: The circuit according to any of aspects 1-13, wherein the resistor ladder is coupled between the output of the reference current source and a reference potential node for the circuit.

Aspect 15: The circuit of aspect 14, wherein one or more switches are coupled between the output of the reference current source and the one or more nodes between the plurality of resistive elements.

Aspect 16: The circuit of aspects 14 or 15, further comprising a capacitive element having a first terminal coupled to the output of the reference current source and a second terminal coupled to the reference potential node.

Aspect 17: The circuit according to any of aspects 14-16, further comprising a capacitive element coupled in parallel with one of the plurality of resistive elements at an end of the resistor ladder that is coupled to the reference potential node.

Aspect 18: A power management integrated circuit comprising the circuit of aspect 1.

Aspect 19: A portable computing device comprising the circuit of aspect 1, wherein the output of one of the multiplexers is coupled to an input of a voltage regulator having an output coupled to a power rail of the portable computing device.

Aspect 20: The portable computing device of aspect 19, further comprising a noise sensitive circuit coupled to the output of the voltage regulator.

Aspect 21: A method of supplying power, comprising: generating multiple reference voltages, the generation of the multiple reference voltages comprising: generating a reference current with a reference current source; and supplying the reference current to a resistor ladder comprising a plurality of resistive elements coupled in series, wherein the reference current source has an output coupled to the resistor ladder and wherein the multiple reference voltages are generated at one or more nodes between the plurality of resistive elements and the output of the reference current source; and selecting, with a plurality of multiplexers having inputs coupled to the one or more nodes and the output of the reference current source, one of the multiple reference voltages output by each of the multiplexers.

Aspect 22: The method of aspect 21, wherein the output of the reference current source has a voltage that matches an output voltage of at least one voltage regulator coupled to at least one of the multiplexers.

Aspect 23: The method of aspects 21 or 22, further comprising selecting to apply a voltage, which is output from a charge pump circuit, to the reference current source if a voltage at a voltage rail is less than or equal to a threshold voltage Aspect 24: The method according to any of aspects 21-23, further comprising selecting a tapping point among the one or more nodes and the output of the reference current source to couple a first terminal of a first capacitive element, wherein a second terminal of the first capacitive element is coupled to a reference potential node.

Aspect 25: The method of aspect 24, further comprising coupling a second capacitive element in parallel with one of the plurality of resistive elements at an end of the resistor ladder that is coupled to the reference potential node.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A circuit, comprising:
   a resistor ladder comprising a plurality of resistive elements coupled in series;
   a reference current source having an output coupled to the resistor ladder;
   a plurality of multiplexers having inputs coupled to one or more nodes between the plurality of resistive elements and the output of the reference current source, each of the multiplexers having an output selectively coupled to one of the inputs of the respective multiplexer; and
   a plurality of voltage regulators having inputs coupled to the outputs of the multiplexers, wherein the output of the reference current source is configured to have a voltage that matches an output voltage of at least one of the voltage regulators.

2. The circuit of claim 1, wherein at least one of the voltage regulators comprises a low-dropout (LDO) voltage regulator.

3. The circuit of claim 2, wherein the LDO voltage regulator comprises a power transistor and an amplifier having an output coupled to a control input of the power transistor.

4. The circuit of claim 3, wherein a first input of the amplifier is coupled to an input of the LDO voltage regulator and wherein a second input of the amplifier is coupled to a drain of the power transistor and an output of the LDO voltage regulator.

5. The circuit of claim 1, wherein each of the inputs of the voltage regulators is coupled to one of the outputs of the multiplexers.

6. A power management integrated circuit comprising the circuit of claim 1.

7. A circuit, comprising:
   a resistor ladder comprising a plurality of resistive elements coupled in series;
   a reference current source having an output coupled to the resistor ladder, wherein the reference current source comprises:
      a bandgap voltage reference circuit having an output and having a power rail input coupled to a first voltage rail;
      a voltage-to-current converter circuit having an output and having an input coupled to the output of the bandgap voltage reference circuit; and
      a current mirror circuit having a first branch coupled between a node and the output of the voltage-to-current converter circuit and having a second branch coupled between the node and the output of the reference current source; and
   a plurality of multiplexers having inputs coupled to one or more nodes between the plurality of resistive elements and the output of the reference current source, each of the multiplexers having an output selectively coupled to one of the inputs of the respective multiplexer.

8. The circuit of claim 7, wherein the bandgap voltage reference circuit includes a Brokaw bandgap voltage reference circuit.

9. The circuit of claim 7, further comprising a charge pump circuit having an output coupled to the node and having an input coupled to the first voltage rail.

10. The circuit of claim 9, wherein the charge pump circuit comprises:
    a bypass switch coupled between the input of the charge pump circuit and the output of the charge pump circuit;
    a first capacitive element coupled in parallel with the bypass switch;
    a second capacitive element;
    a first pair of switches coupled between the first capacitive element and the second capacitive element; and
    a second pair of switches coupled between the second capacitive element and a voltage source coupled between a second voltage rail and a reference potential node.

11. The circuit of claim 10, further comprising a voltage detector circuit having a first input coupled to a threshold voltage source, having a second input coupled to the first voltage rail, and having an output coupled to a control input of the bypass switch.

12. The circuit of claim 11, wherein the voltage detector circuit is configured to open the bypass switch if a voltage at the first voltage rail is less than or equal to a threshold voltage of the threshold voltage source and configured to close the bypass switch if the voltage is greater than the threshold voltage.

13. A circuit, comprising:
    a resistor ladder comprising a plurality of resistive elements coupled in series;
    a reference current source having an output coupled to the resistor ladder; and
    a plurality of multiplexers having inputs coupled to one or more nodes between the plurality of resistive elements and the output of the reference current source, each of the multiplexers having an output selectively coupled to one of the inputs of the respective multiplexer, wherein:
       the resistor ladder is coupled between the output of the reference current source and a reference potential node for the circuit, and
       one or more switches are coupled between the output of the reference current source and the one or more nodes between the plurality of resistive elements.

14. The circuit of claim 13, further comprising a capacitive element having a first terminal coupled to the output of the reference current source and a second terminal coupled to the reference potential node.

15. A circuit, comprising:
    a resistor ladder comprising a plurality of resistive elements coupled in series;

a reference current source having an output coupled to the resistor ladder, wherein the resistor ladder is coupled between the output of the reference current source and a reference potential node for the circuit;

a plurality of multiplexers having inputs coupled to one or more nodes between the plurality of resistive elements and the output of the reference current source, each of the multiplexers having an output selectively coupled to one of the inputs of the respective multiplexer; and a capacitive element coupled in parallel with one of the plurality of resistive elements at an end of the resistor ladder that is coupled to the reference potential node.

16. A portable computing device comprising the circuit of claim 15, wherein the output of one of the multiplexers is coupled to an input of a voltage regulator having an output coupled to a power rail of the portable computing device.

17. The portable computing device of claim 16, further comprising a noise sensitive circuit coupled to the output of the voltage regulator.

18. A method of supplying power, comprising:
generating multiple reference voltages, the generation of the multiple reference voltages comprising:
generating a reference current with a reference current source; and
supplying the reference current to a resistor ladder comprising a plurality of resistive elements coupled in series, wherein the reference current source has an output coupled to the resistor ladder and wherein the multiple reference voltages are generated at one or more nodes between the plurality of resistive elements and the output of the reference current source;
selecting, with a plurality of multiplexers having inputs coupled to the one or more nodes between the plurality of resistive elements and the output of the reference current source, one of the multiple reference voltages output at each of the one or more nodes between the plurality of resistive elements;
selecting a tapping point among the one or more nodes and the output of the reference current source to couple a first terminal of a first capacitive element, wherein a second terminal of the first capacitive element is coupled to a reference potential node; and
coupling a second capacitive element in parallel with one of the plurality of resistive elements at an end of the resistor ladder that is coupled to the reference potential node.

19. A method of supplying power, comprising:
generating multiple reference voltages, the generation of the multiple reference voltages comprising:
generating a reference current with a reference current source; and
supplying the reference current to a resistor ladder comprising a plurality of resistive elements coupled in series, wherein the reference current source has an output coupled to the resistor ladder and wherein the multiple reference voltages are generated at one or more nodes between the plurality of resistive elements and the output of the reference current source; and
selecting, with a plurality of multiplexers having inputs coupled to the one or more nodes between the plurality of resistive elements and the output of the reference current source, one of the multiple reference voltages output at each of the one or more nodes between the plurality of resistive elements, wherein the output of the reference current source has a voltage that matches an output voltage of at least one voltage regulator coupled to at least one of the multiplexers.

20. A method of supplying power, comprising:
generating multiple reference voltages, the generation of the multiple reference voltages comprising:
generating a reference current with a reference current source; and
supplying the reference current to a resistor ladder comprising a plurality of resistive elements coupled in series, wherein the reference current source has an output coupled to the resistor ladder and wherein the multiple reference voltages are generated at one or more nodes between the plurality of resistive elements and the output of the reference current source;
selecting to apply a voltage, which is output from a charge pump circuit, to the reference current source if a voltage at a voltage rail is less than or equal to a threshold voltage; and
selecting, with a plurality of multiplexers having inputs coupled to the one or more nodes between the plurality of resistive elements and the output of the reference current source, one of the multiple reference voltages output at each of the one or more nodes between the plurality of resistive elements.

* * * * *